A. C. GRIFFING.
NUT LOCK.
APPLICATION FILED JUNE 29, 1915.
1,163,403.  Patented Dec. 7, 1915.
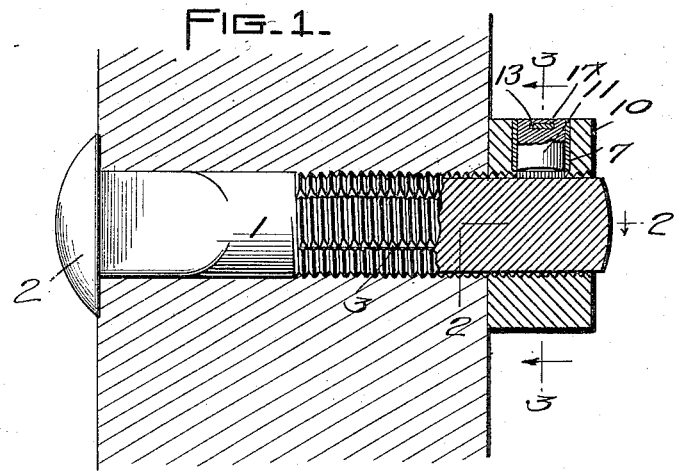
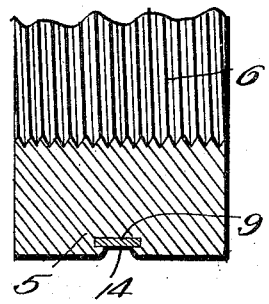
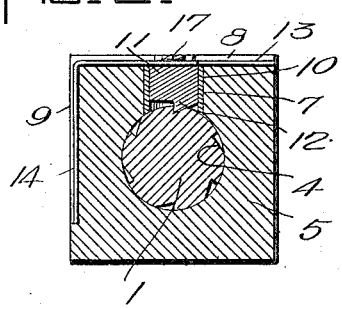
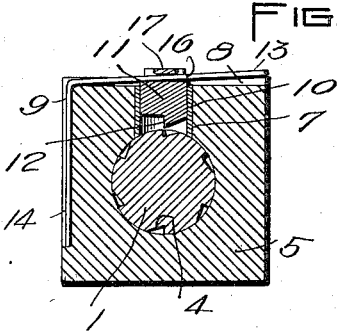
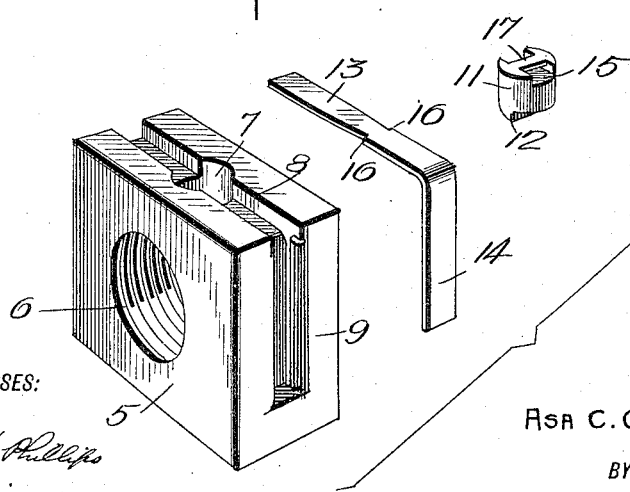
WITNESSES:
John V. Phillips
C. E. Trainor
INVENTOR
Asa C. Griffing,
BY Munn & Co.
ATTORNEYS

UNITED STATES PATENT OFFICE.

ASA CYRUS GRIFFING, OF BASKIN, LOUISIANA.

NUT-LOCK.

1,163,403. Specification of Letters Patent. Patented Dec. 7, 1915.

Application filed June 29, 1915. Serial No. 36,952.

*To all whom it may concern:*

Be it known that I, ASA CYRUS GRIFFING, a citizen of the United States, and a resident of Baskin, in the parish of Franklin and State of Louisiana, have invented certain new and useful Improvements in Nut-Locks, of which the following is a specification.

My invention is an improvement in nut locks, and the invention has for its object to provide a simple, inexpensive and easily operated lock of the character specified, for preventing accidental dislodgment of the nut from the bolt, wherein the locking mechanism is supported by the nut, and coöperates with the bolt to prevent accidental reverse rotation of the nut on the bolt, but arranged to permit the lock to be released to permit reverse movement of the nut.

In the drawings: Figure 1 is a sectional view of a bolt and nut provided with the improved lock; Fig. 2 is an enlarged section on the line 2—2 of Fig. 1, looking in the direction of the arrow adjacent to the line; Figs. 3 and 4 are sections on the line 3—3 of Fig. 1, looking in the direction of the arrows adjacent to the line, and showing the parts in different positions, and Fig. 5 is a perspective view of the nut and lock with the parts separated.

The present embodiment of the invention is shown in connection with a bolt comprising a body 1, having at one end a head 2, and having the other end threaded, as indicated at 3. The threaded portion of the bolt is provided with a longitudinally extending series of grooves 4, each of the grooves as shown in Figs. 3 and 4 having one wall approximately radial to the bolt or slightly undercut, while the other wall is inclined, and the grooves are similarly arranged.

The nut 5 has the usual internally threaded opening 6, and in addition the nut is provided with an opening 7 in one side edge, the said opening 7 being radial to the opening 6. The nut is also provided with a groove 8 extending longitudinally of that side edge provided with the opening 7, and the said groove 8 intersects the opening 7, and is provided with an extension 9 at one end, in the adjacent side wall, the groove 8 and extension 9 being continuous.

A bushing 10 is arranged within the opening 7, and a pawl or locking member 11 of substantially cylindrical form fits within the bushing 10. This pawl or locking member has a tooth 12 at its lower end shaped to fit the grooves 4, and the tooth and grooves 4 are so arranged that while the nut may turn freely in a direction to tighten the nuts on the bolt, it cannot turn in the reverse direction, because the tooth will engage the grooves, and in order that the nut may be turned in the reverse direction the pawl or locking member must be lifted into the position shown in Fig. 4.

An angle plate consisting of portions 13 and 14 is mounted in the groove 8 and extension 9, the body 13 of the plate fitting the groove 8, while the portion 14 of the plate fits the extension 9. This extension 9 has its walls undercut near the lower end of the extension, so that when the plate is in place in the groove and its extension, it is held from disengagement. This undercut portion of the groove 9 is shown in Fig. 2.

The locking member or pawl 11 is provided in its upper end with a transverse diametrical opening 15, and the plate 13 is reduced from near its center to the end remote from the portion 14, forming shoulders 16 at each side of the plate, and the reduced portion is of a width to pass through the notch or recess 15.

It will be noted from an inspection of Fig. 5 that the top wall of the notch or recess 15 is cut away at each side so that when the plate 13 is in place there will be merely a narrow strip 17 extending above the same. The shoulders 16 limit the movement of the pawl or locking member toward the portion 14 of the plate.

In use, the reduced portion of the body of the plate 13 is passed through the opening or recess 14, until the shoulders 16 stop the further movement of the pawl or locking member. The portion 13 of the plate is then inserted in the upper end of the groove 9 and the plate is moved downwardly until the locking member passes into the bushing 10. The lock is now in position for use, and it will be evident that the nut may turn freely in one direction, while the locking member will prevent the turning in the other direction. The said locking member, is, however, easily released by inserting a pointed instrument, as for instance, a nail or the like, under the end of the portion 13 of the plate, and lifting the said end as indicated in Fig. 4. The locking member or pawl is thus lifted out of engagement with the grooves of the bolt, and the nut may be turned in the reverse direction.

I claim:

The combination with the bolt having longitudinally extending grooves at the threads, the nut having an opening radial to the bolt and intersecting the opening of the nut, a locking member fitting the opening and movable therein, and having a tooth for engaging the groove of the bolt, said groove and tooth being arranged to permit forward rotation of the nut and to prevent reverse rotation, said nut having a groove extending longitudinally of that face provided with the opening and having an extension from the groove in the adjacent side, the extension having under-cut side walls, said locking member having a transverse opening at its outer end registering with the groove, and a plate of angular form and consisting of portions extending at approximately a right angle, one of the portions fitting the groove and extending through the opening of the locking member, and the other fitting the extension.

ASA CYRUS GRIFFING.

Witnesses:
S. E. MILLER,
J. P. CORRIGAN.

Copies of this patent may be obtained for five cents each, by addressing the "Commissioner of Patents, Washington, D. C."